United States Patent Office 3,117,261
Patented Jan. 7, 1964

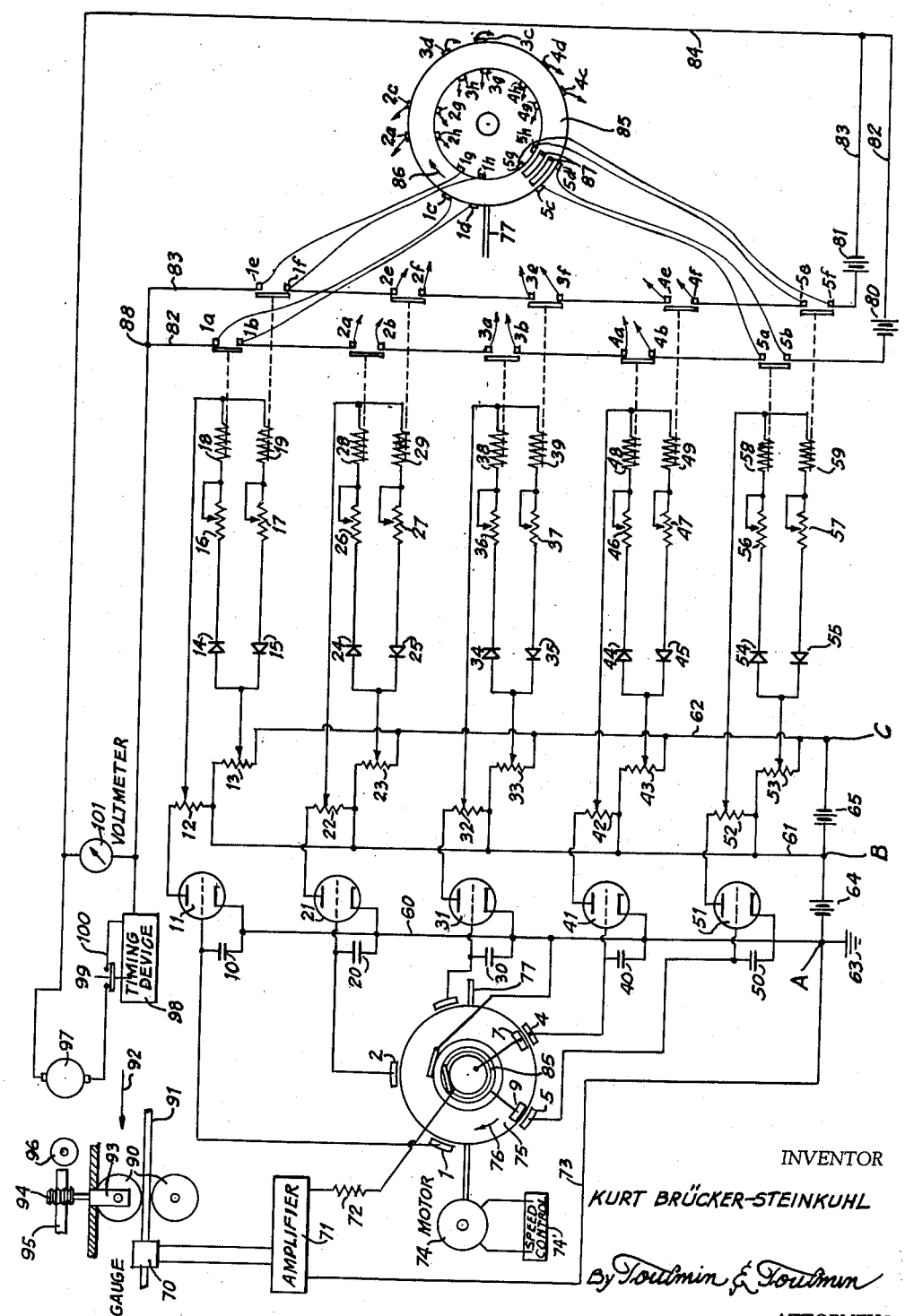

3,117,261
PRODUCTION CONTROL SYSTEM
Kurt Brücker-Steinkuhl, Liesegangstr. 10,
Dusseldorf, Germany
Filed Dec. 30, 1957, Ser. No. 706,092
Claims priority, application Germany Dec. 31, 1956
1 Claim. (Cl. 318—6)

The present invention relates to a statistical quality control system of production processes. More particularly, the invention relates to a control system based on the utilization of a run of sample variables.

In supervising production processes, physical characteristics are checked in many instances, such as the thickness of bands or strips of material, the diameter of shafts, the pitch of screw threads, etc. According to the present control system, consecutive production samples are tested and the test results examined as to whether they exceed the upper or lower limit of a given range of values. If the single test values of a plurality of consecutive samples which, jointly, constitute a sample group, and all of which are not above the upper limit or not below the lower limit, this fact is taken as an indication that the production process operates normally. On the other hand, if the single test values of such a plurality of consecutive samples exceed the lower or upper limit of the range, the normal production process is considered disturbed to a degree that corrective measures are necessary. For purposes of this disclosure, a succession of $n$ uniform, characteristical values, i.e. a succession of $n$ values fitting within the same range of frequency distribution, is called a run. Thus, according to the present invention, runs are checked as to whether they fall without predetermined limits.

Control systems which utilize averages of control values have been previously disclosed. According to such systems, a predetermined number of single sample values is obtained and the algebraic average of the single values is determined. Depending upon whether this average falls without or within a predetermined range of values, the production process is readjusted or not. After this check, an identical number of $n$ new samples is taken and an average of their single values is obtained. Thus, according to such prior systems, a predetermined number $n$ of single values is checked in every instance; only after digestion of these $n$ single values, say five single values which, obviously, require a certain amount of time, can it be determined whether or not the production process requires any adjustment.

It is, therefore, one object of the present invention to provide a production control system which offers considerable advantages, although this system also requires a definite number of single values to produce a sample group. However, once a sample group has been formed from $n$ single values, it is no longer necessary to take $n$ new single values to form a new sample group and to deal therewith. The new sample group is simply formed by discarding the first single value of the first sample group and adding a new single value thereto. This procedure is contniuously followed in the described manner so that each taking of an individual value permits a determination of whether the production process is to be readjusted or not. Thus, trouble is recognized immediately after inception, much earlier than with other known control systems. Consequently, at modern high speed processes, the use of the present control system can be of decisive importance.

It is another object of the present invention to provide a production control system which consists of eliminating, from a group of single values, the first single value and adding in lieu thereof a new single value, which system might be called a method of continuously forming sample groups. Only the run control system permits such a continuous formation of sample groups, in contrast to the average system whereby from a number of single values a new value, namely the average value, is determined algebraically. If there is a sudden trouble in a manufacturing process controlled by means of the average system, it may happen that the trouble is recognized only after two or three average values have been taken, in other words the trouble will become known only after $2n$ or $3n$ single values have been taken and the averages thereof determined. With the run control system using the continuous formation of sample groups, the trouble is recognized after taking a fraction of $2n$ or $3n$ single values which, obviously, represents a substantial improvement.

It is still another object of the present invention to provide a statistical control system of the afore-described kind, whereby the establishing of a run being outside the predetermined control limits is utilized to produce a voltage signal which causes an automatic adjustment of the production process in the required direction.

With these and other objects in view, which will become apparent in the following detailed description, the present invention will be clearly understood in connection with the accompanying drawings, in which:

The FIGURE is a diagrammatic illustration of a control in accordance with the present invention.

Referring now to the drawings, in the following, the use of the present invention is exemplified in the thickness control when rolling strip steel. It is to be understood, however, that the present invention is confined neither to a checking of the thickness of strip steel nor to thickness control in general, but is equally suitable for controlling and measuring any other physical variables, such as length, weight, voltage, transparency, etc.

The rolling of steel strip material is a continuous process, the thickness of the product being continuously measured with an appropriate instrument. Out of the sequence of measurements, single measuring values are selected by means of the present invention. With appropriate changes, however, the present invention may be also used in conjunction with discontinuous production processes, such as the making of shafts, etc.

The pre-established control limits for the single values of the sample groups are determined from the product between the control limit factor and the standard deviation. The control limit factor for a predetermined size of sample groups can be taken from calculated tables and the standard deviation is computed from the single values of one or several sample groups. Since it can be assumed that, in most production processes, the standard deviation will not vary during production, it is sufficient to check standard deviations only occasionally.

When rolling steel strip material, automatic thickness gages are usually employed which, being mounted some distance behind the mill, continuously show the thickness of the band steel on a dial indicator. It is practically impossible to maintain the thickness at exactly the desired value throughout the entire rolling process. As indicated by the fluctuating hand of the dial, deviations from the desired value of more or less magnitude occur which, however, must remain within specified tolerances. It is often difficult for the operator, particularly at a high speed mill, to determine the exact moment at which the rollers must be readjusted to keep the strip at approximately the desired thickness. In order to eliminate these difficulties, automatic regulating devices, according to the present invention, are provided. Operating according to statistical methods, these devices afford optimum production results because they are particularly quick in eliminating operation trouble.

FIG. 1 illustrates an embodiment wherein, according to the present invention, sample groups are formed from single values in order to check for runs. A rotating electric switch permits the digestion and manipulation of altogether five single values. One of these five single values, namely the first, is discarded or eliminated; in lieu thereof, another single value is added so that the sample group which is to be tested each time consists of a sequence of four single values. Obviously, the number four is not intended as a limitation; sample groups consisting of more or fewer than four single values can be used just as well.

The numeral 90 indicates a rolling mill for the production of strip steel 91 which passes, in the direction of the arrow 92, between the two rollers of the mill. As shown, the upper of the two rollers is mounted to permit a variable and adjustable rolling pressure. For example, the mounting 93 of the upper roller may be provided with a spindle 94, operated by a worm gear 95. The latter, in turn, is driven by a pinion 96, actuated by a motor 97. Rotation of the motor 97 in one direction causes upward motion of the spindle 94 and, thereby, a decrease in roller pressure, whereas rotation of the motor 97 in the other direction produces downward motion of the spindle and increase in roller pressure.

The thickness of the material is continuously measured with a thickness gauge 70 emitting voltage signals that are proportional to the thickness. These signals are increased in strength by an amplifier 71 whose output circuit 73 includes a resistor 72 and extends between terminals 6 and 63, of which the terminal 6 is connected with a periodically acting switching device; and the terminal 63 is grounded. FIG. 1 of the drawing shows two rotating members 75 and 85 of a double switch mounted on a shaft 77 which is rotated by an auxiliary rotor 74. The latter is regulated by a speed control device 74' permitting speed adjustment according to the desired switching period.

By means of the input terminal 6 which slidingly contacts a cylinder 6a of the rotating switch member 75, the input voltage is passed to a rotating contact element 7 and from there, depending upon the rotary position of the switch, to stationary contact elements 1, 2, 3, 4 and 5. FIG. 1 of the drawing illustrates the position in which the rotating element 7 contacts the stationary element 4. From the stationary contact elements 1, 2, 3, 4 and 5 the measuring voltage is led to condensers 10, 20, 30, 40 and 50 and from there to the control grids of tubes 11, 21, 31, 41 and 51, respectively. A common lead 60 connects the condensers to the grounded terminal 63. Arranged preceding the rotating contact element 7 is a likewise rotating contact element 9, held by the cylinder 8a which is mounted insulated from the cylinder 6a. A terminal 8 held in sliding contact with the cylinder 8a is likewise grounded through lead 60. The angular distance between the two rotating elements 7 and 9 is equal to that of the respective stationary elements 4 and 5. Consequently, the moment the element 7 arrives at element 4, the element 9 contacts the element 5. In the illustrated arrangement, the switch 75 rotates clockwise, in the direction of the arrow 76.

The anodes of tubes 11, 21, 31, 41 and 51 are connected with respective plate resistors 12, 22, 32, 42 and 52, designed as potentiometers which constitute parts of a circuit 61 connecting the plate-voltage source 64 with the tubes 11, 21, 31, 41 and 51. In addition to being connected to the wire 61, a junction of each potentiometer 12, 22, 32, 42 and 52 is additionally connected with one end of potentiometers 13, 23, 33, 43 and 53, respectively, whose other ends are connected to a lead 62. Connected across leads 61 and 62 is another voltage source 65. Source 64 passes current from terminal B through 61 and 12—11, 22—21, 32—31, 42—41 and 52—51, respectively, to terminal A. Source 65 passes current from terminal B through the potentiometers 13, 23, 33, 43 and 53, respectively, to terminal C.

A sliding contact connects the potentiometer 13 with two parallel circuit branches, one comprising a diode 14, a rheostat 16 and a relay 18, while the other comprises a diode 15, a rheostat 17 and a relay 19. The diodes 14 and 15 have mutually opposed poling so that the branch circuit of diode 14 conducts only in one direction (from left to right on the drawing), and the branch circuit of diode 15 conducts only in the other direction. The coils of relays 18 and 19 are joined and connected with the slide contact of the potentiometer 12. In an analogous manner, each of the potentiometers 23, 33, 43 and 53 is provided with similar branch circuits, including the components 24–29, 34–39, 44–49 and 54–59. It will thus be observed that the voltage drops across potentiometers 12 and 13 are compared by means of two oppositely polarized relays.

The rheostats 16 and 17 are adjusted and the relays 18 and 19 are rated for response of the relays to current values above a given minimum and to permit the flow of such minimum currents through the coils of relays 18, 19 only if currents of a corresponding minimum value flow through potentiometers 12, 13. As soon as sufficient current flows through the coil of relay 18 or 19, the normally open relay contact closes and bridges the terminals 1a and 1b, or 1e and 1f. The branch circuits for tubes 21, 31, 41 and 51 are similar so that, for example, upon actuating the relay 28 or 29, the terminals 2a and 2b, or 2e and 2f are connected with each other.

The terminals 1a, 1b and 1e, 1f are wired to fixed contacts 1c, 1d and 1g, 1h of a rotary switch 85. In an analogous manner, all other terminals of the relay contact are wired to respective contacts of the rotary switch. Thus, the terminals 2a, 2b and 2e, 2f are wired to the fixed contacts 2c, 2d and 2g, 2h, respectively. In order to simplify the drawing, the wiring beginning with the terminals 2a, 2b and including the contacts 4g, 4h has been indicated by arrows only.

The switch 85 rotates clockwise, as indicated by the arrow 86. Attached to the rotating part of the switch 85 are two contact elements 87 which are insulated from each other and which, depending upon the position of the rotating switch 85 or contact elements 87, respectively, bridge the contacts 1a, 1b and 1e, 1f. The rotating part of switch 85 is actuated in synchronism with the switch 75, and the contacts 87 cooperate with contact 9 of switch 75. Thus, if, as shown in FIG. 1, the contact element 9 of switch 75 is in a position adjacent to the fixed contact element 5 which is part of the grid circuit of tube 51, the rotating contact of switch 85 establishes a connection between the fixed contacts 5a, 5b and 5e, 5f that are associated with tube 51. Thus, the purpose of switch 85 is to simulate a response of those two relays pertaining to that one of the voltage comparison circuits the input capacitor of which is discharged via rotary contact 9.

The moment all of the contacts 1a—1b, 2a—2b, 3a—3b, 4a—4b and 5a—5b are connected with each other, either directly by the action of relays 18, 28, 38, 48 and 58, or through the bridging action of the contact elements 87 of switch 85, the wire 88 connects one terminal of a current source 80 with a timing device 98.

Similarly, when all contacts 1e—1f, 2e—2f, 3e—3f, 4e—4f and 5e—5f are bridged by the action of respective relays 19, 29, 39, 49, 59 or by the action of the contact elements 87 in switch 85, another current source 81 is connected by the wire 88 to the timing device 98. Relative to timing device 98, the two current sources 80 and 81 have mutually opposed poling. Hence, a positive and negative voltage is alternately applied to the timing device. By means of wires 82 and 83, the other terminals of current sources 80 and 81 are connected to each other and, by means of a wire 84, to one terminal of the motor 97 whose other terminal is connected to the contact 99 of the timing device. A wire 100 and a relay enclosed in the timing device connect contact 99 to wire 88. The contact 99 of the timing device is normally closed. If current is supplied to the motor 97 from one of the sources 80 or 81, the contact 99 drops off after a certain, adjustable time interval $t_1$, and the current supply to the motor ceases.

After a further, likewise adjustable time interval $t_2$, the contact 99 again closes automatically. The interval $t_1$ determines the amount of adjustment of the rolling mill caused by the action of motor 97. The interval $t_2$ is preferably selected as equivalent to the time required for a given part of the strip steel to travel from between the rollers 90 to the thickness gauge 70. A voltmeter 101 indicates the voltage difference between the circuit leads 84 and 88.

The embodiment illustrated in the figure operates in the following manner: The thickness gauge 70 produces a variable voltage proportional to the momentary thickness of the strip steel. After amplification in 71, this voltage is applied to the contacts 1, 2, 3, 4 and 5 of switch 75 and to the storing condensers 10, 20, 30, 40 and 50 of tubes 11, 21, 31, 41 and 51, respectively. Because of the chopping action of switch 75, the measuring voltage reaches the respective tubes only at definite time intervals, thus selecting individual samples out of a continuous succession of measuring values. The condensers 10, 20, 30, 40 and 50 are charged according to the measuring values of these samples, and the charging condition of the condensers in turn determines the respective grid voltages and, thus, the plate current flowing in tubes 11, 21, 31, 41 and 51. The condensers and their respective time constants are appropriately selected so that the grid voltages remain substantially unchanged during one rotation of switch 75. Now, before the condensers are again charged with another voltage impulse during the next rotation of switch 75, the condenser charges produced by the first voltage impulses must be eliminated and the tubes must be ready for the next operation. This, too, is accomplished by switch 75. Whereas charging takes place by means of the rotating contact element 7, the rotating contact element 9 causes a discharge of the condensers. As mentioned, the angular distance between 7 and 9 is exactly the same as that between the two fixed contact elements 4 and 5. In the sequence 5, 1, 2, 3 and 4 shown in FIG. 1, the contact element 5 and the condenser 50 connected therewith receive the first charge. Since the condenser 50 is discharged through 5, 9 and 60, this first or initial measuring value is discarded. After such discharge, the condenser 50 is ready for the next charge through contact element 7 upon further rotation of the switch. In the illustrated position of the switch, the tubes 11, 21, 31 and 41 connected with the fixed contact elements 1, 2, 3 and 4 represent the sample group. Upon the next rotation of the switch, the tubes 21, 31, 41 and 51 become the sample group so that with each turn of the switch, a different sample group is provided for checking.

In the following, the conditions within the circuit of tube 11 are described as typical, the conditions in the circuits of tubes 21, 31, 41 and 51 being exactly the same. Upon the application of a certain grid voltage which depends on the momentary thickness of the band steel, a certain amount of plate current passes through tube 11 and potentiometer 12. Simultaneously, the resistor 13 is traversed by a constant current which depends only upon the voltage of source 65. The potentiometer taps at 12 and 13 are adjusted in such a manner that, at a certain grid voltage which is equivalent to the desired thickness of the band steel, no voltage difference exists between the potentiometer taps at 12 and 13. As a result, no current flows through the adjacent circuit branches, including the relays 18 and 19. Only when the band thickness commences to vary from the desired thickness and, as a result of such variation, the grid voltage becomes smaller or larger than the adjusted standard grid bias, a current passes through either relay 18 or relay 19. The relays 18 and 19 and the resistors 16 and 17 are rated or set so that the relays pick up only after a certain minimum voltage difference between the taps at 12 and 13 is exceeded. This minimum voltage is equivalent to the change in the grid bias voltage and, consequently to the change in the thickness of the band steel. Thus, the relays 18 and 19 are actuated only if the change in thickness exceeds a pre-established amount. Appropriate adjustment of the resistors 16 and 17 provides for respective thickness control limits.

If the change in thickness is uniform over a certain length of strip steel and the change exceeds a certain range in one or the other direction, all four tubes 11, 21, 31 and 41 will behave alike. For example, the four relays 18, 28, 38 and 48 will close the circuit from 1a—1b to 4a—4b. In this situation, tube 51 is not ready to act and the contacts 5a—5b are therefore bridged by the switch 85. The circuit connecting the source 80 with the timing device 98 and the motor 97 is closed and the latter adjusts the gap between the rollers in one direction. If, however, the relays 19, 29, 39 and 49 are actuated, the circuit connecting the source 81 of opposite polarity with the timing device and the motor is closed and the latter adjusts the roller gap in the other direction. Inasmuch as the relays 18 and 19, 28 and 29, etc. cannot be actuated at the same time, the circuits between 1a and 5b on the one hand and between 1e and 5f on the other hand cannot be closed at the same time. Therefore, only three different operating conditions are possible:

(1) All four test values are above the control limits; the four relays 18, 28, 38 and 48 close, and the source 80 energizes the motor 97 for rotation in the direction causing reduction in thickness of the material.

(2) All four test values are below the control limits; the four relays 19, 29, 39 and 49 close, and the source 81 energizes the motor 97 for rotation in the direction causing increase in thickness of the material.

(3) At least one of the four test values lies below the upper limit and above the lower limit; at least one of the four relays 18, 28, 38, 48 and at least one of the four relays 19, 29, 39 and 49 is not actuated and the circuits including the contacts 1a to 5b and 1e to 5f remain open. The motor 97 is not energized and the thickness of the material is not changed.

By means of the timing device 98, the motor is cut in only a given length of time as required for attaining the desired change in thickness. The timing device 98 can be also made dependent upon the current flowing through the relays 18 or 19, 28 or 29, etc., whereby the period of time during which the motor is in action and the amount of roller pressure is being regulated become dependent upon the degree of thickness deviation beyond the permissible limits.

After adjustment of the rollers 90, the rolled strip steel requires a certain time to reach the thickness gauge 70. Ordinarily, material passing from the roller to the thickness gauge would emit additional adjustment signals. In order to prevent such signals from becoming operative, the timing device 98 provides that the contact 99, once opened, will close only after elapse of an adjustable timing interval which is at least equal to the travel time of the material from the rollers 90 to the thickness gauge 70.

Aside from regulating the thickness of rolled band steel, the device can be also used to only indicate whether or not an adjustment is required. The voltmeter 101 serves this purpose, since it functions regardless of whether or not the motor 90 is energized. Any deflection of the needle indicates that an adjustment in one or the other direction is required.

It is known that the thickness of strip steel depends not only upon the pressure exerted by the rolling mill, but also upon the rolling speed. Consequently the thickness can be adjusted not only by means of lifting or lowering the rollers, but also by altering the speed at which the band is being pulled through the mill. The regulating voltage of the device according to the present invention can be advantageously used to appropriately alter the field strength of the capstan motor or other variable-speed drive that determines the speed of the material.

I claim:

In a statistical system for comparing and indicating the thickness of strip material being rolled including a rolling mill stand having rolling-pressure regulating means for determining the thickness of said strip material, a control circuit comprising a thickness gauge having an output voltage variable in dependence upon said thickness, a number of voltage-responsive memorizing devices, cyclical switching means sequentially connecting said devices to said gauge, control means connected to all of said devices and responsive to the accumulated effect of said voltage pulses memorized at any one time by the totality of said devices, and said control means being connected to said regulating means for controlling it to maintain the thickness of said material within given limits.

References Cited in the file of this patent
UNITED STATES PATENTS

| | | |
|---|---|---|
| 1,969,536 | Winne | Aug. 7, 1934 |
| 2,664,557 | Sargrove | Dec. 29, 1953 |
| 2,821,696 | Shiowitz et al. | Jan. 28, 1958 |
| 2,837,732 | Nelson | June 3, 1958 |
| 2,897,638 | Maker | Aug. 4, 1959 |

OTHER REFERENCES

Publication "American Machinist," pp. 121–125, Oct. 24, 1955.